United States Patent
Zou et al.

(10) Patent No.: US 6,762,049 B2
(45) Date of Patent: Jul. 13, 2004

(54) MINIATURIZED MULTI-CHAMBER THERMAL CYCLER FOR INDEPENDENT THERMAL MULTIPLEXING

(75) Inventors: Quanbo Zou, Singapore (SG); Uppili Sridhar, Singapore (SG)

(73) Assignee: Institute of Microelectronics, Singapore (SG)

( * ) Notice: Subject to any disclaimer, the term of this patent is extended or adjusted under 35 U.S.C. 154(b) by 15 days.

(21) Appl. No.: 09/898,124

(22) Filed: Jul. 5, 2001

(65) Prior Publication Data

US 2003/0008286 A1 Jan. 9, 2003

(51) Int. Cl.[7] .................. C12Q 1/68; C12P 19/34; C12M 1/34; C07H 21/02; C07H 21/04
(52) U.S. Cl. .................. 435/287.2; 435/6; 435/7.1; 435/91.1; 435/91.2; 530/22.1; 530/23.1; 530/24.3; 530/24.31; 530/24.32; 530/24.33; 422/68.1
(58) Field of Search .................. 435/6, 7.1, 91.1, 435/91.2, 287.2; 530/22.1, 23.1, 24.3, 24.33; 422/68.1

(56) References Cited

U.S. PATENT DOCUMENTS

| 5,639,423 A | | 6/1997 | Northrup et al. ............. 122/50 |
| 5,646,039 A | | 7/1997 | Northrup et al. .......... 435/287.2 |
| 5,674,742 A | | 10/1997 | Northrup et al. .......... 435/286.5 |
| 5,733,509 A | * | 3/1998 | Ackley et al. .............. 422/131 |
| 5,939,312 A | * | 8/1999 | Baier et al. .............. 435/287.2 |
| 6,132,996 A | * | 10/2000 | Hunicke-Smith .......... 435/91.2 |
| 6,509,186 B1 | * | 1/2003 | Zou et al. ................. 435/286.1 |

OTHER PUBLICATIONS

Adam T. Woolley, et al., (UC Berkeley), "Functional Integration of PCR Amplification and Capillary Electrophoresis in a Microfabricated DNA Analysis Device," Analytical Chemistry vol. 68, pp. 4081–4086.

S. Poser, et al., "Chip Elements for Fast Thermocycling", Eurosensros X, Leuven, Belgium, Sep. 1996, pp. 1197–1199.

M. Allen Northrup, et al., (Lawrence Livermore National Lab, UC Berkeley, Reche Molecular Systems), "DNA Amplification With a Microfabricated Reaction Chamber", 7th Intl. Conf. Solid–State Sensors and Actuators, pp. 924–926.

Ajit M. Chaudhari, et al., (Stanford Univ. and PE Applied Biosystems "Transient Liquid Crystal Thermometry of Microfabricated PCR Vessel Arrays", J. Microelectromech. Systems, vol. 7, No. 4, 1998, pp. 345–355.

* cited by examiner

Primary Examiner—Jeffrey Siew
(74) Attorney, Agent, or Firm—George O. Saile; Stephen B. Ackerman

(57) ABSTRACT

It is often desirable to be able to perform an array of micro-chemical reactions simultaneously but with each reaction proceeding at a different temperature and/or for a different time. A classic example is the polymerase chain reaction associated with DNA analysis. In the present invention, this is achieved by means of an apparatus made up of a chip of plastic, or similar low cost material, containing an array of reaction chambers. After all chambers have been filled with reagents, the chip is pressed up against a substrate, typically a printed circuit board, there being a set of temperature balancing blocks between the chip and the substrate. Individually controlled heaters and sensors located between the blocks and the substrate allow each chamber to follow its own individual thermal protocol while being well thermally isolated from all other chambers and the substrate. The latter rests on a large heat sink to avoid temperature drift over time. A process for manufacturing the apparatus is also disclosed.

15 Claims, 4 Drawing Sheets

MINIATURIZED MULTI-CHAMBER THERMAL CYCLER FOR INDEPENDENT THERMAL MULTIPLEXING

FIELD OF THE INVENTION

The invention relates to the general field of microchemistry with particular reference to polymerase chain reactions.

BACKGROUND OF THE INVENTION

Existing miniaturized thermal cyclers, for controlled chemical reactions in general and for polymerase-chain-reaction (PCR) in particular, are usually expensive or non-disposable due to expensive materials and high manufacturing costs (e.g. silicon/glass) for large size chips (usually >100 mm$^2$). Low-cost plastic chips have been developed for multi-chamber reactions, but these offer only a single thermal protocol. Multi-chamber independent thermal multiplexing has many advantages to offer (e.g. for rapid PCR parallel processing) but is still not yet available in the micro-world.

Miniaturized thermal cyclers have been successfully demonstrated for years in the application of the amplification of nucleic acids with the well-known polymerase chain reaction (PCR) technology [1-8]. Quick and accurate thermal cycling can be easily achieved in very small sample volume consumption in a micro thermal cycler. Most of the recently developed microthermal cyclers are fabricated using microelectronic techniques which are popularly used in the integrated circuit (IC) industry and micro-electromechanical systems (MEMS) applications. Due to the expensive materials and processing, such a miniaturized thermal cycler usually costs quite a number of dollars/chip, a far cry from a disposable chip which is usually required in many biomedical and other biotechnology applications.

To achieve a disposable biochip, e.g., PCR thermal cycler, plastics have been investigated by several groups. Bio- and temperature compatible plastics (e.g., polypropylene and polycarbonate, etc.) are popular materials used in macro-PCR thermal cyclers in a format of vessel/tube. Although plastics themselves show fair thermal conductivity compared with silicon and glass, which might result in slow thermal response and bad temperature uniformity, its low cost, in materials and processing (mold replication), makes it promising for mass production of disposable PCR chips, especially when a large chip is required for a definite volume (e.g. >1–10 μL).

A multi-chamber thermal cycler using the same thermal protocol has been developed by Baier [8]. To further take advantage of the multi-chamber, we have developed a multi-chamber thermal cycler where each chamber can be independently controlled by an individual thermal protocol. This makes it possible to simultaneously run a large number of PCR amplifications having different thermal protocols in a short time, which is very useful and important in optimization of mass PCR protocols, and in multi-PCR parallel multiplexing using individually controllable thermal cycling Multi-chamber independent thermal cyclers can be presently seen in the macro world only in Cepheid's products (4 chambers in 1997 and 16 chambers in 2000).

The present invention teaches how to build up a miniaturized multi-chamber (at least 1-chamber) thermal cycler for independent thermal multiplexing at relatively low-cost or a disposable micro-PCR or μ-thermal cycling related reaction chips.

The reference numbers used above refer to the following:

1. M. Allen Northrop, et al, (Lawrence Livermore National Lab, UC Berkeley, Roche Molecular Systems), "DNA Amplification with a microfabricated reaction chamber", 7$^{th}$ Intl. Conf. Solid-state sensors and actuators pp. 924–926.
2. Adam T. Woolley, et al, (UC Berkeley), "Functional Integration of PCR Amplification and Capillary Electrophoresis in a Microfabricated DNA Analysis Device", Analytical Chemistry, Vol. 68, pp. 4081–4086.
3. S- Poser, et al, "Chip Elements for Fast Thermocycling", Eurosensors X, Leuven, Belgium, Sep 96, pp. 1197–1199.
4. Ajit M. Chaudhari, et al, (Stanford Univ. and PE Applied Biosystems), "Transient Liquid. Crystal Thermometry of Microfabricated PCR Vessel Arrays", J. Microelectromech. Systems, Vol, 7, No. 4, 1998, pp. 345–355.
5. Baier Volker, et al, (Jena Germany), "Miniaturized multi-chamber thermocycler", U.S. Pat. No. 5,939,312, Aug. 17, 1999.
6. Northrup; M. Allen, (Berkeley, Calif.), "Microfabricated reactor", U.S. Pat. No. 5,639,423, Jul. 17, 1997.
7. Northrop; M. Allen, (Berkeley, Calif.), "Microfabricated reactor", U.S. Pat. No. 5,646,039, Jul. 8, 1997.
8. Northrop; M Allen, (Berkeley, Calif.), "Microfabricated reactor", U.S. Pat. No. 5,674,742, Oct. 7, 1997.

SUMMARY OF THE INVENTION

It has been an object of the present invention to develop a thermal cycler for multi-chamber independent thermal control, using low-cost reusable or disposable miniaturized reaction chips.

Another object has been to provide a process to manufacture said thermal cycler.

These objects have been achieved by means of an apparatus made up of a chip of plastic, or similar low cost material, containing an array of reaction chambers. After all chambers have been filled with reagents, the chip is pressed up against a substrate, typically a printed circuit board, there being a set of temperature balancing blocks between the chip and the substrate. Individually controlled heaters and sensors located between the blocks and the substrate allow each chamber to follow its own individual thermal protocol while being well thermally isolated from all other chambers and the substrate. The latter rests on a large heat sink to avoid thermal drift over time. A process for manufacturing the apparatus is also disclosed.

DESCRIPTION OF THE PREFERRED EMBODIMENTS

Figure 1:
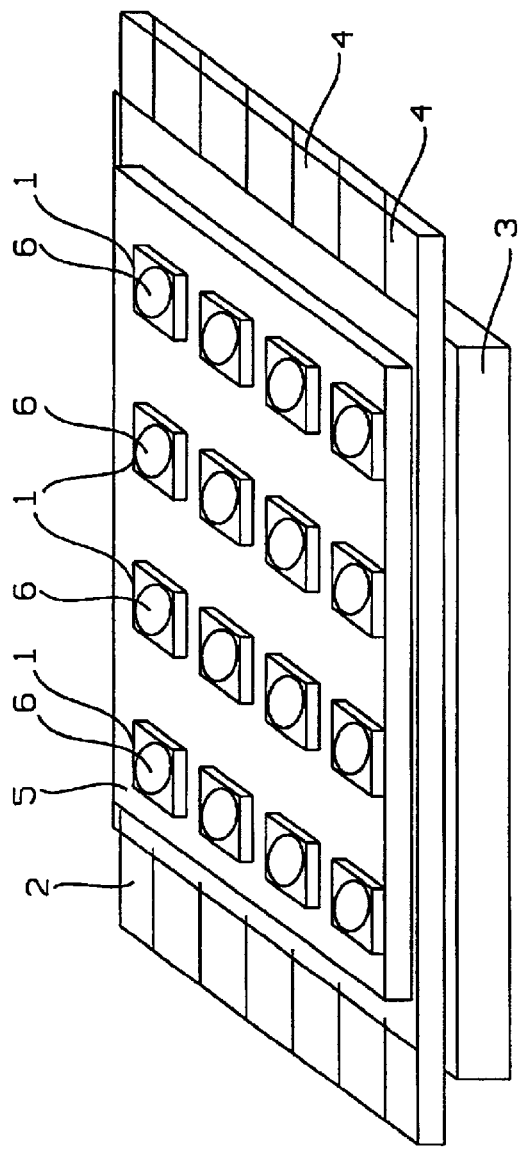
FIG. 1 is an isometric overview of the invention.

An overview of the invention is shown in isometric projection in FIG. 1. One or more high thermal conductance temperature balancing blocks 1, hereinafter referred to simply as blocks, (made of silicon or a suitable metal such as aluminum, copper, silver, or gold) are attached to a low thermal conductance substrate 2 such as a printed circuit board (PCB) in an array format for multiple chambers 6.

Typically, each reaction chamber has a depth between about 0.05 and 1 mm and a volume between about 0.1 and 25 mm$^3$ resulting in a density of between about 1 and 128 chambers per sq. inch. The substrate 2 can also be perforated for better thermal isolation between chambers. The substrate is attached to a substantial heat sink 3 (a plate or block of ceramic, silicon, or metal such as copper, aluminum, or gold), whose temperature remains around room temperature (or unheated) for quick cooling through conduction of the substrate 2.

A low-cost reusable or disposable chip 5 made of plastic (or other material such as polymers, elastomers, glass, silica, and ceramics) that is compatible with the chemical reaction involved, is placed on top of the blocks 1 and pressed for good contact. The surface profiles of the blocks and the chip are tailored to facilitate rapid alignment between them just prior to pressing them together. At least one chamber 6 is put on top of each block 1. Heaters and temperature sensors (not shown in FIG. 1) can be on top or bottom of the block 1, and electrically led out to the edge connection 4 on the substrate 2 (e.g. PCB). All electric connections on the substrate are strongly preferred to be on the bottom surface of the substrate 2, to eliminate the parasitic thermal conductance caused by the connecting metal lines.

Figure 2:
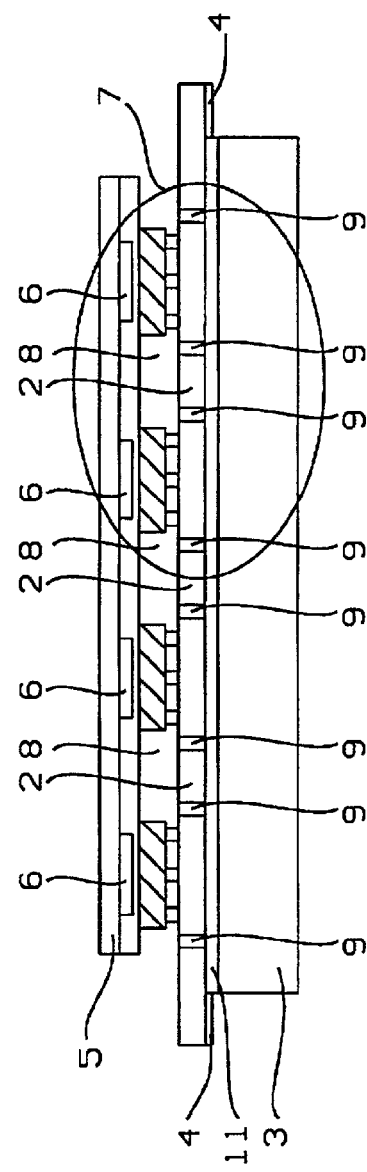
FIG. 2 is a cross-sectional overview of the invention.

A cross-sectional view of the invention is shown in FIG. 2 where the free space 8 (air or vacuum) serves to thermally isolate adjacent blocks such as 1. Vias such as 9 on substrate 2 are used for electric connection from top side to bottom side thereof. Major electric connections (metal lines) are placed on the bottom side of the substrate 2, and not on the top side, to eliminate thermal cross-talk between chambers, as the metal lines cause serious parasitic thermal conductance due to the high thermal conductivity of metals.

We now describe two embodiments of the invention that differ in the way that blocks 1 are mounted onto substrate 2. These embodiments are illustrated in FIGS. 3 and 4 and are both enlargements of area 7 in FIG. 2.

Figure 3:
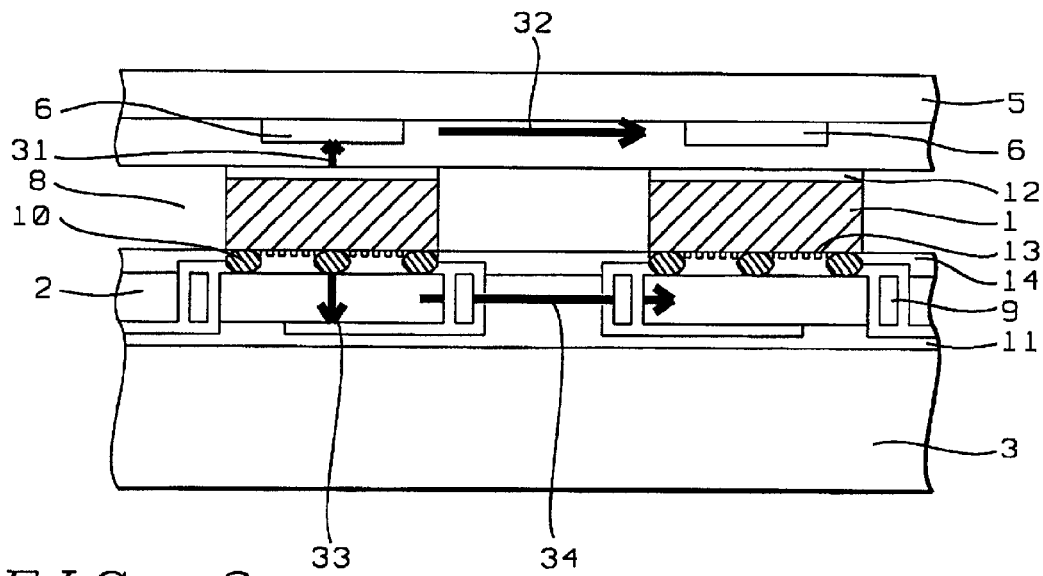
FIGS. 3 and 4 show two embodiments of the invention that employ different ways to connect to the PCB.

In the first embodiment, as shown in FIG. 3, the heater and sensor 13 is on the bottom of the block and contact to the PCB 2 is made through solder bumps 10 which electrically lead out of the bond-pads on block 1 to metal pads on PCB substrate 2. The solder bumps allow for very low thermal resistance from block 1 to the substrate 2 as a result of the very short thermal path distance (normally 1 mil) of the metal alloy. A thin, contact enhancing, layer of high thermally conductive as well as soft material (e.g., rubber, polymer, grease, gel, etc.) 12 is placed on top of each block 1 for better mechanical/thermal contact with the microreaction chip 5. By soft in this context we refer to a material that is softer than 100 and harder than 1 when measured on a Shore D Durometer (or similar instrument), while by 'high thermal conductivity' we refer to a thermal conductivity that is between about 2 and 500 W/m.K Heater and sensor 13 on the bottom of each block 1 in FIG. 3 can be formed from high temperature coefficient of resistance (TCR) materials, e.g. metal alloys or polysilicon thin films, with good ohmic contact through soldering metal alloy 10. Between the block 1 and the substrate 2, a thin film of soft, electrically nonconductive material 14 can be applied for better thermal contact and resistance to corrosion by chemicals and environment.

Figure 4:
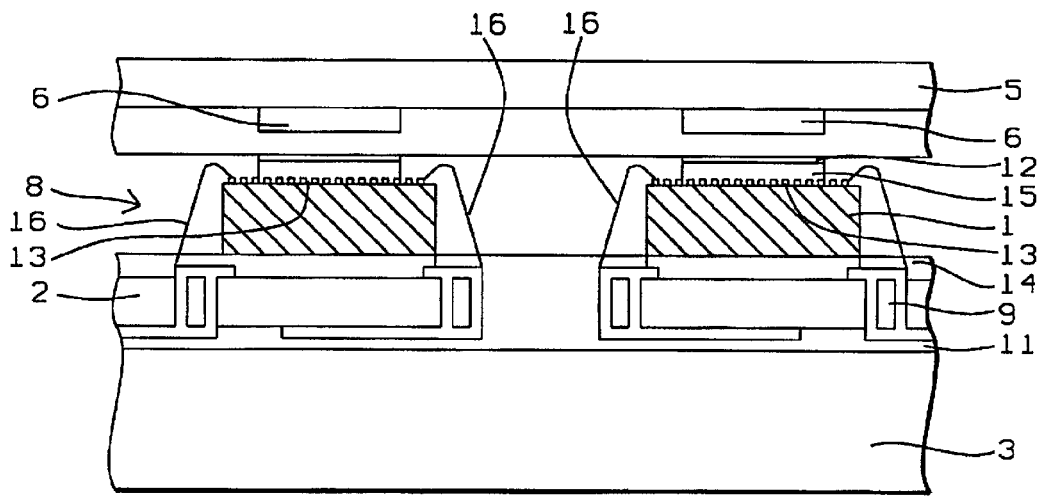

In the second embodiment, as shown in FIG. 4, the heater and sensor 13 are on top of block 1, and another, smaller block 15, also of high thermal conductivity, is mounted on top of them. Bond-pads (located where block 15 is not covering block 1) are wire-bonded to vias such as 9 on substrate 2 through wires 16. As a result, there are no wires above the top surface of the block 15 so a planar micro-reaction chip 5 can be directly placed on top. Via 9 connects metal lines on top and on bottom of the substrate. As in the first embodiment, an electrically insulating thin film 11 that is coated onto the bottom side of the substrate 2 is used to glue/bond the PCB substrate 2 onto the heat sink 3 with good contact (no air/vacuum gap). Layer 11 could be any of several materials such as adhesives, epoxies, polymers, or grease.

Since the micro-reaction chip is intended to be either disposable or reusable, it is important that, once the chambers have been filled with the appropriate reagents, the chip can be properly, easily, and quickly attached to the rest of the structure so that the reactions that will take place inside the chambers can proceed without further delay Similarly, once the intended reaction time has elapsed it is important to be able to rapidly disengage the chip from the blocks.

Figure 5:
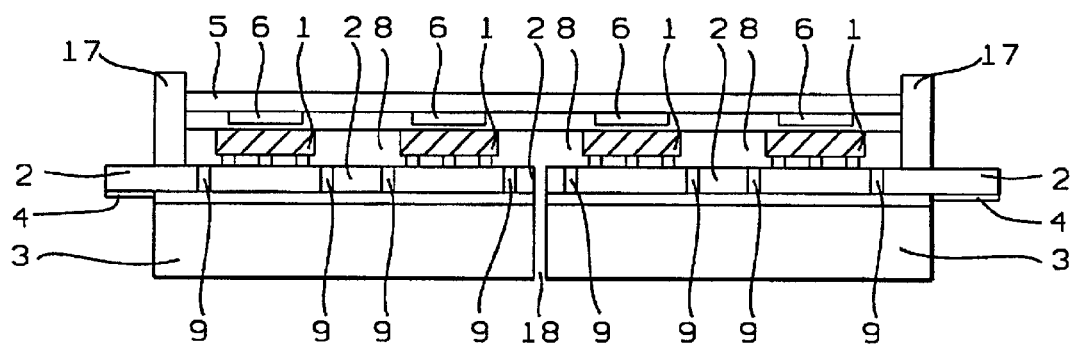
FIGS. 5 through 7 show three ways to press the various components of the apparatus together.

We have developed three different ways of accomplishing this:

(1) As illustrated in FIG. 5, the low-cost or disposable micro-reaction chip 5 is pressed up against blocks 1 through vacuum force. A through-hole 18 on the substrate and the heat sink is connected to a vacuum pump or syringe (not shown). Sidewall 17 around the edge of the chip 5 is used to seal the vacuum chamber.

Figure 6:
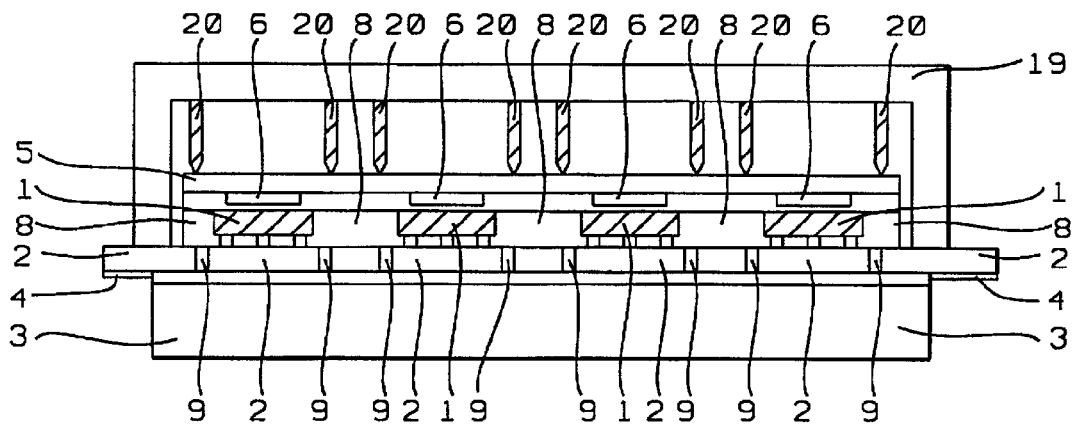

(2) As illustrated in FIG. 6, the chip 5 is pressed against the blocks by means of a fixture that is made up of a rigid covering case 19 from whose interior upper surface sharp rods 20 extend. These make good mechanical and thermal contact to the chip and introduce only a small thermal parasitic conductance.

Figure 7:
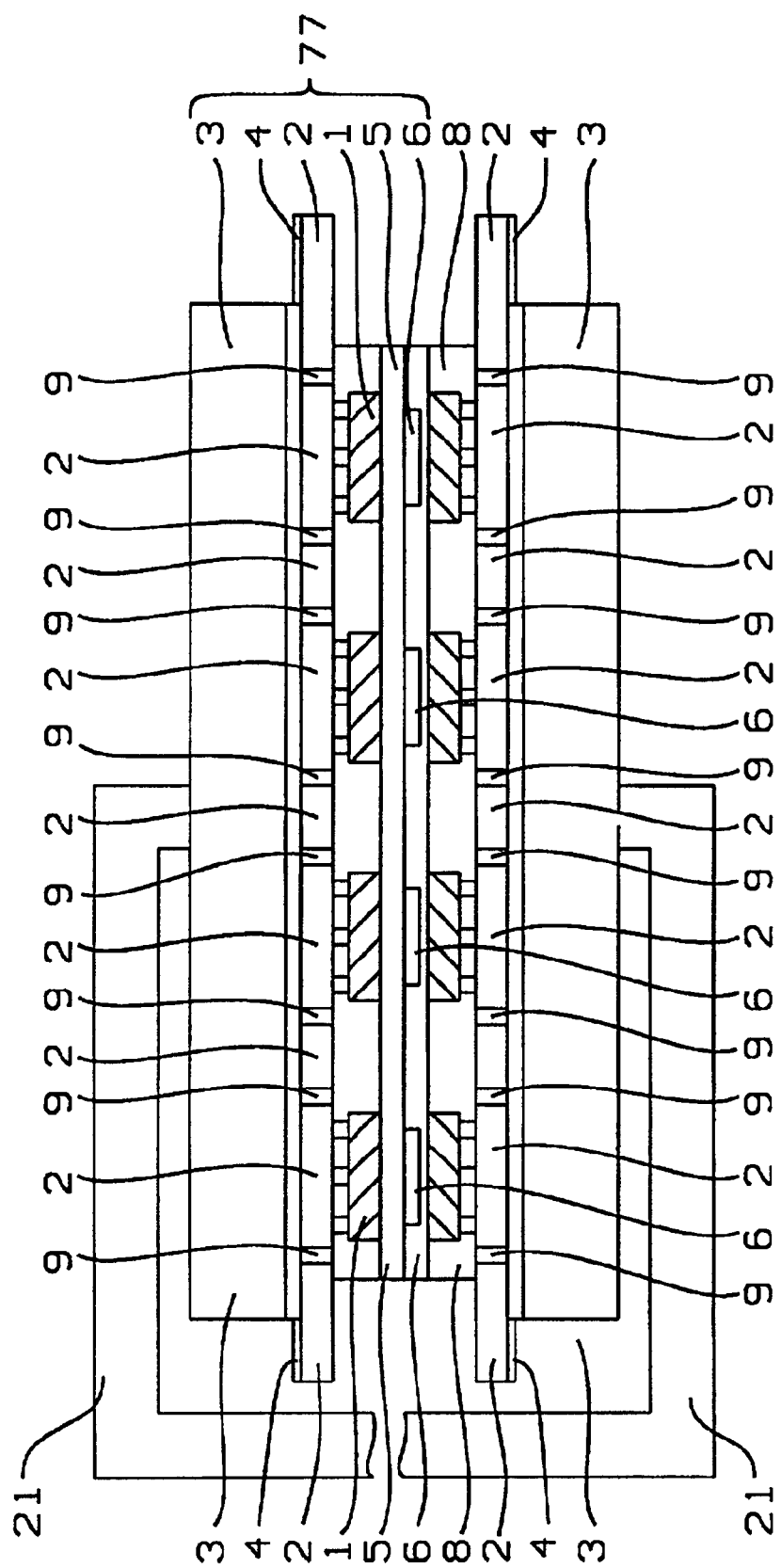

(3) As illustrated in FIG. 7, an additional, and identical, thermal cycler 77 (including balancing block, PCB substrate and heat sink) is placed, inverted, onto the top surface of micro-reaction chip 5. The two thermal cyclers are pressed together by an adjustable clamp 21 for good contact. For optimum operation of this arrangement to give easier mechanical/thermal control, two clamps (not shown) may be used so that the pressure between the two sets of thermal cyclers is more evenly distributed.

Discussion and Results:

As seen in FIG. 3, arrow 33 (henceforth to be referred to as R_Sub_Z) represents the thermal resistance of the thermal path between balancing block 1 and the heat sink 3. Similarly, arrow 31 (R_Chip_Z) points to the thermal path between balancing block 1 and the chamber 6, arrow 34 (R_Sub_X) points to the thermal path between each pair of adjacent blocks 1 through the substrate 2, and arrow 32 (R_Chip_X) points to the thermal path between adjacent blocks 1 through chip 5. To obtain excellent thermal isolation between chambers 6, R_Sub_X and R_Chip_X should be much larger than R_Sub_Z. An approximate relation can be stated as follows:

$$\eta=(\lambda_c h_s h_c)/(\lambda_s WS)<<1$$

Where $\eta$ is the relative thermal cross-talk between adjacent chambers. $\lambda_c$ and $\mu_s$ are thermal conductivity of the chip and the substrate, $h_s$ and $h_c$ the thickness of substrate and chip, W and S the width and spacing (edge-to-edge) of the adjacent blocks, respectively.

The device described earlier has been simulated using finite element methods (FEM), and measurements made on a prototype model. For the following typical dimensions and material properties (block: silicon 500 microns thick, substrate PCB (FR4) 200 microns thick, reaction chip: polycarbonate\polypropylene 600 microns thick, uniform heat flux for ΔT=75° C. heating: 5.5 W/cm², steady state simulation shows good temperature uniformity (<0.5° C.) inside a chamber. Transient simulation shows a typical time constant of around 5 seconds, which means very quick thermal response for plastic chips. Thermal cross-talk between adjacent chambers can be less than 1–3% of the maximum temperature, and can be further reduced by increasing the thermal resistance ratio of R_Chip_X to R_Sub_Z. The balancing block (silicon in simulation) has a very uniform temperature (<0.1° C. at 100° C. above the room temperature) all over the whole block due to its high thermal conductivity.

A simple prototyping model was built up for conceptual verification. At least 2×3 silicon blocks with heating and temperature sensing resistors (Al metalization) are attached onto a polycarbonate plate of 1 mm thick, with a 16 mm spacing. The polycarbonate microchip containing multi-well reaction chambers (sealed with thin tape) was put on a metal chuck under a probe-station. While probing the heater on one block, probes for temperature sensing on the same block and on an adjacent block were applied simultaneously. Meanwhile, miniaturized thermocouple (Type T, welded tip, RS Components) tips (diameter of less than 0.5 mm, much smaller than the size of reaction chamber that is larger than 5 mm on a side and 1 mm in depth) were also inserted into the reaction chambers filled with Dl water for measuring temperature in the chambers. Filling of the chambers is most easily accomplished by means of micro-pipettes or syringes.

All the probes with very sharp and long arms have much larger thermal resistance than the concentrated thermal resistance around the chamber, to make sure that the probes have limited effect on the total thermal model. The thermocouples (for temperature of samples) and the built-in sensors on the blocks (for temperature of blocks) give consistent results at steady states. The measured relationship between heating power and achieved temperature met expectations. Thermal cross-talk between adjacent chambers was measured to be less than 0.3° C., at a temperature of 34° C. above the room temperature (20° C.). The measured data agreed well with the expected results.

When compared with macro-PCR machines with the similar functions, the structure of the present invention displayed improved performance by way of rapid thermal response and reduced sample consumption. When compared with miniaturized multi-chamber thermal cyclers, the present invention showed a significant advantage in independent thermal parallel processing and in the possibility of using low-cost or disposable micro-PCR chips.

While the invention has been particularly shown and described with reference to the preferred embodiments thereof, it will be understood by those skilled in the art that various changes in form and details may be made without departing from the spirit and scope of the invention.

What is claimed is:

1. An apparatus for simultaneously performing multiple, independently controlled, polymerase chain reactions, comprising:
   a printed circuit board having upper and lower surfaces;
   said lower surface being in direct contact with a layer of electrically insulating material which is in direct contact with a heat sink;
   on said upper surface, an electrically insulating layer of soft material having high thermal conductivity;
   on the soft layer, an array of resistance heaters and temperature sensors;
   solder bumps that extend downwards from the array and pass through said soft layer to provide electrical connections between the array and the circuit board thereby enabling each heating source to be independently controlled;
   on each heater and sensor of the array, and in direct contact with the soft layer, a block having high thermal conductivity;
   a chip, formed of material that is thermally insulating;
   means for uniformly pressing the chip against the blocks, including surface profiles for the blocks and the chip that facilitate rapid alignment between chip and the blocks;
   a layer of contact enhancing material between the chip and the blocks;
   reaction chambers within said chip, at least one reaction chamber symmetrically overlying each block when the chip is pressed against the blocks; and
   means for filling and emptying each chamber with reagents used in said polymerase chain reaction.

2. The apparatus described in claim 1 wherein said means for uniformly pressing the chip against the blocks further comprises:
   sidewalls attached to the chip, said sidewalls extending downwards from the chip by an amount such that, when the chip touches the blocks said sidewalls just contact the printed circuit board, thereby forming an airtight enclosure; and
   a hole that passes through both the heat sink and the printed circuit board thereby enabling air in said enclosure to be evacuated.

3. The apparatus described in claim 1 wherein said means for uniformly pressing the chip against the blocks further comprises:
   a covering case, having a ceiling, that rests on the printed circuit board and that encloses both the blocks and the chip; and
   extending downwards from said ceiling, rods having free ends that are pointed each having a length such that, when the covering case rests on the circuit board, said rods press down on the chip.

4. The apparatus described in claim 1 wherein said means for uniformly pressing the chip against the blocks further comprises:
   a fixture that includes an additional heat sink, an additional printed circuit board, and additional blocks;
   said fixture being positioned in an inverted orientation touching the chip whereby said additional heat sink, additional printed circuit board, and additional blocks are aligned relative to said heat sink, printed circuit board, and blocks; and
   an adjustable clamp that presses together the fixture, the chip, and the blocks.

5. The apparatus described in claim 1 wherein said layer of electrically insulating material is selected from the group consisting of adhesives, epoxies, polymers, and grease.

6. The apparatus described in claim 1 wherein said layer of soft material is selected from the group consisting of epoxies, polymers, and grease.

7. The apparatus described in claim 1 wherein the blocks are made of a material selected from the group consisting of silicon, metals, and ceramics.

8. The apparatus described in claim 1 wherein said layer of contact enhancing material is selected from the group consisting of polymers, rubbers, and grease.

9. An apparatus for simultaneously performing multiple, independently controlled, polymerase chain reactions, comprising:
- a printed circuit board having upper and lower surfaces;
- said lower surface being in direct contact with a layer of electrically insulating material which is in direct contact with a heat sink;
- on said upper surface, an electrically insulating layer of soft material having high thermal conductivity;
- on the soft layer, an array of first blocks having high thermal conductivity
- on each first block, a resistance heater and a temperature sensor;
- in direct contact with each first block, a second block having high thermal conductivity and that is smaller than the first block whereby each heater and sensor on a first block is partially covered by a second block and is partially exposed;
- wires that extend downwards from the exposed portions of the heaters and sensors, that pass through the soft material to make electrical contact to the printed circuit board, thereby enabling each heating source to be independently controlled;
- a chip, formed of material that is thermally insulating;
- means for uniformly pressing the chip against the second blocks, there being a layer of contact enhancing material between the chip and the second blocks;
- reaction chambers within said chip, at least one reaction chamber symmetrically overlying a single second block when the chip is pressed against the blocks; and
- means for filling and emptying each chamber with reagents used in said polymerase chain reaction.

10. The apparatus described in claim 9 wherein said means for uniformly pressing the chip against the blocks further comprises:
- sidewalls attached to the chip, said sidewalls extending downwards from the chip by an amount such that, when the chip touches the blocks said sidewalls just contact the printed circuit board, thereby forming an airtight enclosure; and
- a hole that passes through both the heat sink and the printed circuit board thereby enabling air in said enclosure to be evacuated.

11. The apparatus described in claim 9 wherein said means for uniformly pressing the chip against the blocks further comprises:
- a covering case, having a ceiling, that rests on the printed circuit board and that encloses both the blocks and the chip; and
- extending downwards from said ceiling, rods having free ends that are pointed, each having a length such that, when the covering case rests on the circuit board, said rods press down on the chip.

12. The apparatus described in claim 9 wherein said means for uniformly pressing the chip against the blocks further comprises:
- a fixture that includes an additional heat sink, an additional printed circuit board, and additional blocks;
- said fixture being positioned in an inverted orientation touching the chip whereby said additional heat sink, additional printed circuit board, and additional blocks are aligned relative to said heat sink, printed circuit board, and blocks; and
- an adjustable clamp that presses together the fixture, the chip, and the blocks.

13. A process for simultaneously performing multiple, independently controlled, chemical reactions, comprising:
- providing, on a heat sink, a printed circuit board on which is an array of blocks, said blocks having high thermal conductivity;
- providing an array of reaction chambers in a chip formed of material having low thermal conductivity;
- filling each reaction chamber with reagents necessary for said chemical reaction and then pressing the chip against the blocks, in a manner such that at least one reaction chamber symmetrically overlies a single block;
- attaching sidewalls to the chip, said sidewalls extending downwards from the chip by an amount such that, when the chip touches the blocks said sidewalls just contact the printed circuit board, thereby forming an airtight enclosure;
- evacuating the enclosure through a hole that passes through both the heat sink and the printed circuit board; and
- independently heating each block that is overlaid by a filled reaction chamber whereby the reagents in each chamber are maintained at a constant and uniform temperature for a time period, said temperature and time period being independently adjustable for each chamber.

14. A process for simultaneously performing multiple, independently controlled, chemical reactions, comprising:
- providing, on a heat sink, a printed circuit board on which is an array of blocks, said blocks having high thermal conductivity;
- providing an array of reaction chambers in a chip formed of material having low thermal conductivity;
- filling each reaction chamber with reagents necessary for said chemical reaction and then pressing the chip against the blocks, in a manner such that at least one reaction chamber symmetrically overlies a single block;
- providing a covering case, having a ceiling, that rests on the printed circuit board and that encloses both the blocks and the chip;
- providing rods that extend downwards from said ceiling, each rod having a free end that is pointed and a length such that, when the covering case rests on the circuit board, said rods press down on the chip;
- placing the covering case on the circuit board thereby causing said rods to press the chip against the blocks; and
- independently heating each block that is overlaid by a filled reaction chamber whereby the reagents in each chamber are maintained at a constant and uniform temperature for a time period, said temperature and time period being independently adjustable for each chamber.

15. A process for simultaneously performing multiple, independently controlled, chemical reactions, comprising:
- providing, on a heat sink, a printed circuit board on which is an array of blocks, said blocks having high thermal conductivity;
- providing an array of reaction chambers in a chip formed of material having low thermal conductivity;
- filling each reaction chamber with reagents necessary for said chemical reaction and then pressing the chip against the blocks, in a manner such that at least one reaction chamber symmetrically overlies a single block;

providing a fixture that includes an additional heat sink, an additional printed circuit board, and additional blocks;

positioning said fixture in an inverted orientation to touch the chip with said additional heat sink, additional printed circuit board, and additional blocks being aligned relative to said heat sink, printed circuit board, and blocks;

using an adjustable clamp, pressing together the fixture, the chip, and the blocks; and independently heating each block that is overlaid by a filled reaction chamber whereby the reagents in each chamber are maintained at a constant and uniform temperature for a time period, said temperature and time period being independently adjustable for each chamber.

* * * * *